Feb. 25, 1941.                R. D. MOORE                 2,233,218
                        WATER PURIFICATION SYSTEM
                        Filed Aug. 10, 1938         2 Sheets-Sheet 1
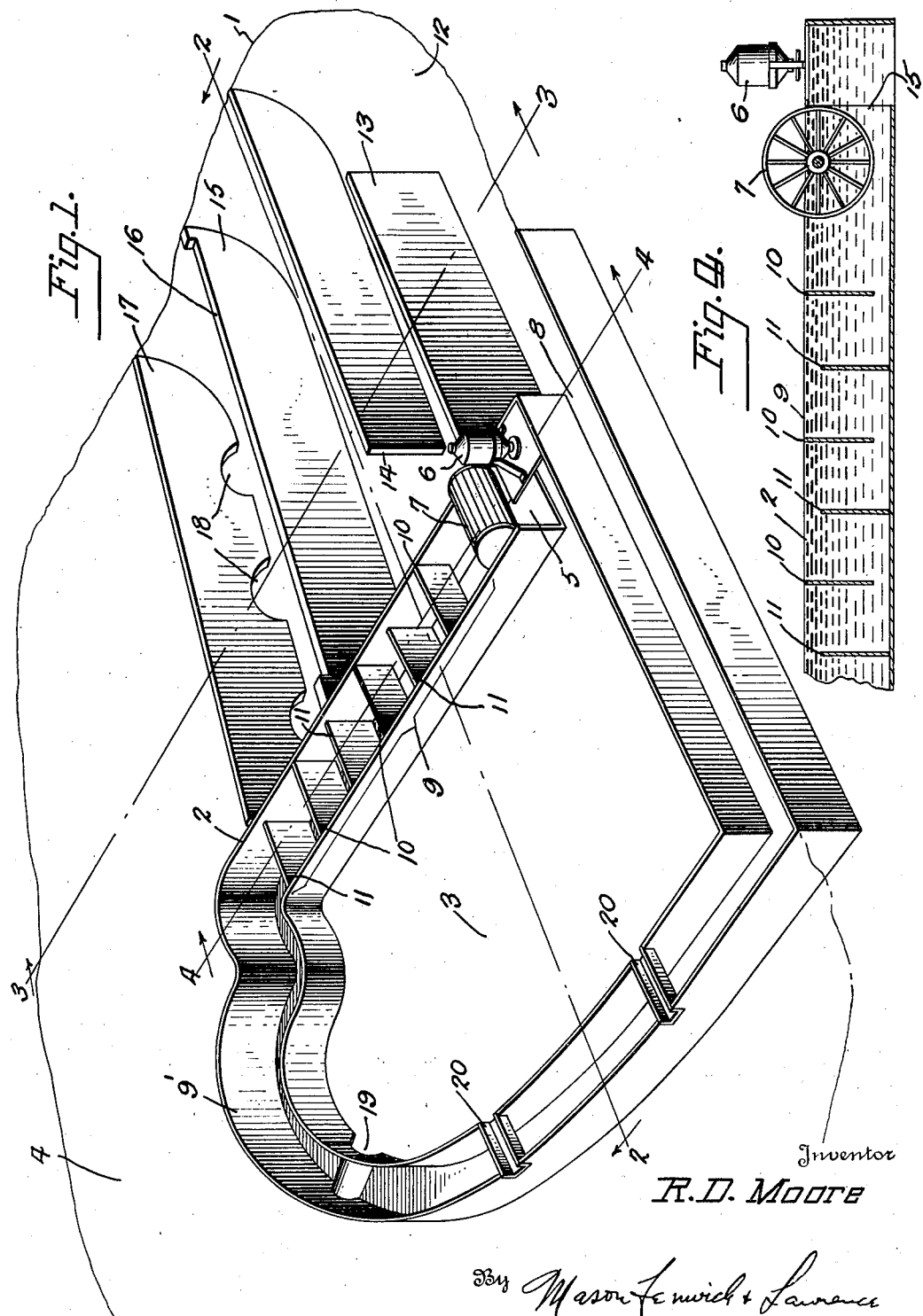
Inventor
R. D. Moore
By Mason Fenwick & Lawrence
Attorneys Feb. 25, 1941.   R. D. MOORE   2,233,218
WATER PURIFICATION SYSTEM
Filed Aug. 10, 1938   2 Sheets-Sheet 2
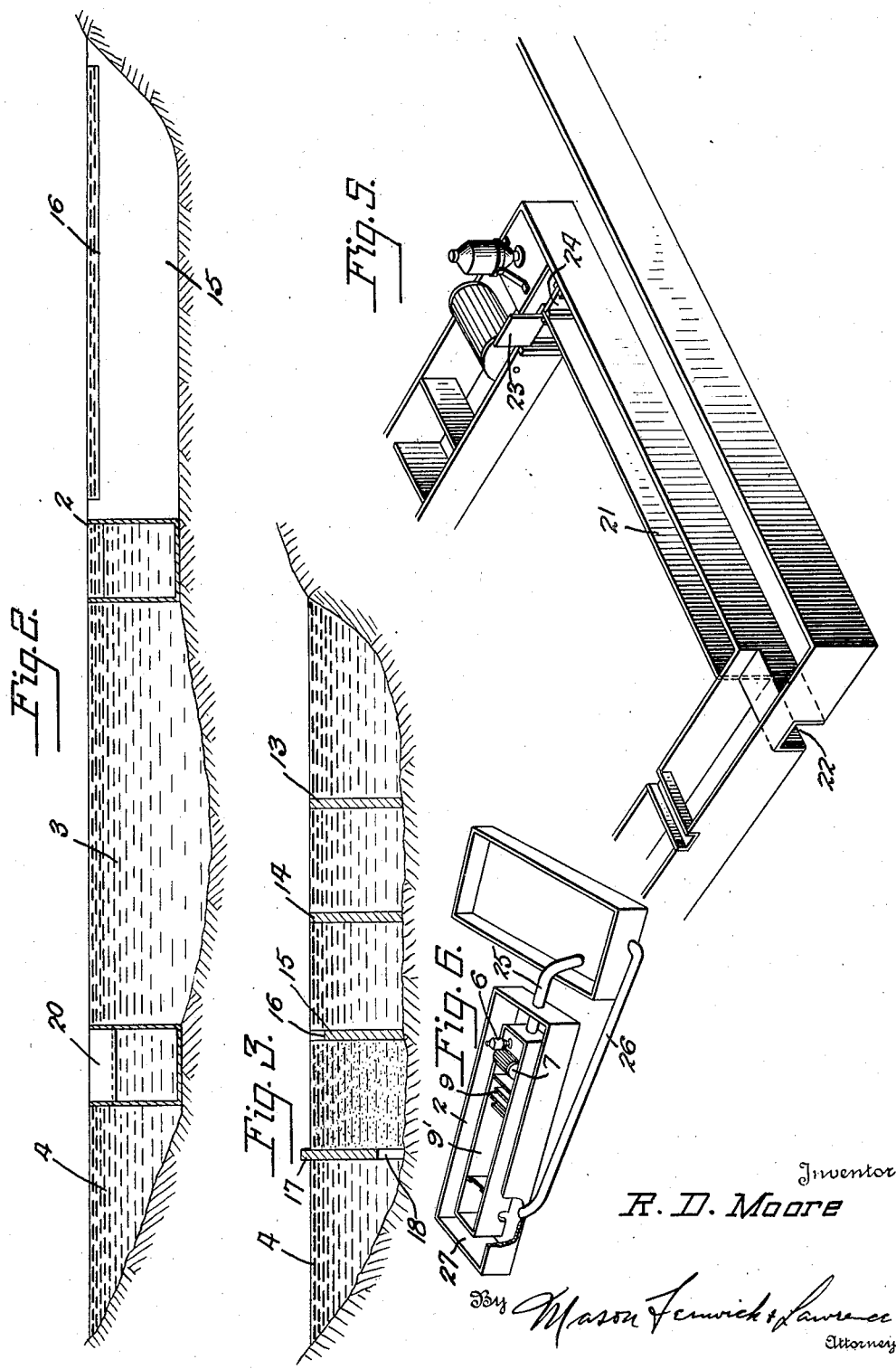
Inventor
R. D. Moore
By Mason Fenwick & Lawrence
Attorneys Patented Feb. 25, 1941

2,233,218

UNITED STATES PATENT OFFICE 2,233,218

WATER PURIFICATION SYSTEM

Richard D. Moore, Chester, Va.,

Application August 10, 1938, Serial No. 224,194

12 Claims. (Cl. 210—11)

This invention relates to a water purification system especially designed to recondition the water in lakes or pools of such size or character that the rate of flow of fresh water inlet is inadequate to keep pace with the rate of contamination. For example, a swimming lake may have a volume of 2,000,000 gallons and a fresh water inlet flowing at the rate of 2000 gallons per hour. Under such conditions it would require more than 40 days to make one complete change of water in the lake. During this time, with daily bathers varying in number from 100 to 500, for example, there would be an inordinate accumulation of foreign matter, not only bacterial in character, but matter consisting of superficial dirt and body wastes, much of which remains in suspension in the water, and some of which settles over night to be subsequently stirred up by the feet of the bathers. The evidence of the presence of this filth is a permanently cloudy appearance of the water which makes it unattractive to bathers.

It is comparatively simple to reduce the bacterial content to a safe minimum by means of chlorine or other chemicals, but sterile filth is no more tolerable than bacterial active matter, and boards of health are readily taking cognizance of this condition and demanding its amelioration.

The problem has been attacked heretofore by providing a filtering or settling pond or basin at a higher level than that of the swimming lake, to pump water from the lake to the elevated pond or basin and to return the purified water to the lake by gravity.

It is obvious that an immense amount of water must be withdrawn per unit of time and treated, in order to obtain a reasonable degree of purification in the body of lake water. This the elevated filtering or settling systems as heretofore known are unable to do, largely on account of limitations in the size of available conduits, and perhaps more importantly, limitations, forced by economy, in the amount of power employed. Filtering or settling systems of this type are practical only for small artificial pools or if used in connection with a large lake, they are a mere ineffective gesture in the direction of purification.

The principal object of the invention is to provide a purification system that will recondition a maximum amount of water in a minimum unit of time. The carrying out of this object requires the submergence of the purification system in the lake substantially to the point where the water level in the purification system is at the same level as the water in the lake. Under these conditions, since there is substantially no head of water to lift, a minimum of power is required to pump the water from the body of the lake into the apparatus of the purification system, so that with a given economical practical amount of power a large quantity of water may be conducted through the purification system in a minimum time unit and therefore the conduits involved in the conduct of the water may be made large in cross section. There is no limit to the size of the conduits, for being submerged in the lake they are balanced inside and out and no particular consideration need be given to their structural stability.

Another object of the invention is to provide a submerged purification system, for the purpose of eliminating the necessity of building strong structures which will withstand internal water pressure, thus bringing the cost of the system down to the point of practical use in connection with road-side or tourist camp swimming lakes. This applies as well to purification systems elevated above the lake to be treated, for the purification system may be submerged in a natural or artificial pool or lake above the level of the lake to be treated and the water pumped to the purification system through an ordinary pipe conduit. As hereinbefore stated, such an elevated purification system is suitable only for quite small natural or artificial pools.

Still another object of the invention is the provision of a water purification system including a conduit through which water is pumped from the lake or pool which is to be purified, said conduit being provided at its anterior end with means for feeding flocculating or other purifying chemicals to the water, a suitable length of said conduit immediately posterior to that at which the purifying chemicals are added being provided with baffles and functioning as a mixing chamber and another suitable length of said conduit immediately posterior to said mixing chamber functioning as a reaction chamber in which the flocs are developed, but through which the water is kept moving at a velocity sufficient to prevent sedimentation, said conduit flowing out into a settling basin where the velocity of flow is checked and the flocculated material is deposited, the purified and clarified water then preferably, but not necessarily, passing through a filter and being re-admitted to the lake or source from which it was drawn.

In its most specific embodiment, the invention relates to a submerged purification system for a swimming lake having a peripheral relatively shallow pool and a central deep pool, the deep pool being defined by the conduit of the purification system which is suitably shaped to surround and segregate the deep body of water from the surrounding shallow body, the water conduit of said purification system comprising as above stated an anterior point at which purification chemicals are added, and serially thereafter, a baffle section constituting a mixing chamber, and a section constituting a reaction chamber, said conduit discharging into a settling chamber which is segregated from the portion of the lake utilized for bathing, with a pump for circulating the water through the purification conduit, and gates adapted when alternatively operated to place either the deep pool or the shallow pool into direct communication with the purification system whereby either the deep or shallow pool may be purified to the substantial exclusion of the other, there being a submerged conduit suitably placed for putting the shallow pool in communication with the deep pool, and one or more conduits at the surface level of the water in both pools for permitting floating objects which would otherwise be trapped in the shallow pool to flow over into the deep pool and eventually be discharged from the purification system.

Other objects of the invention will appear as the following description of a preferred and practical embodiment thereof proceeds.

In the drawings throughout the several figures of which the same characters of reference have been employed to designate identical parts:

Figure 1 is a perspective view of a specific embodiment of my invention installed in a swimming lake having a deep and shallow pool;

Figure 2 is a section taken along the line 2—2 of Figure 1;

Figure 3 is a section taken along the line 3—3 of Figure 1;

Figure 4 is a section taken along the line 4—4 of Figure 1;

Figure 5 is a perspective view of a slightly modified form of the invention, that portion which is not involved in the modification not being shown; and Figure 6 is a perspective view of my invention applied to an elevated purification plant.

Referring now in detail to the several figures and particularly to that form of the invention shown in Figures 1 to 4, inclusive, the numeral 1 represents the shore line of a natural lake having natural water inlets and outlets, not shown. This lake utilized as a swimming pool and as is almost universally the case with lakes so employed, the inlet of fresh water is altogether inadequate to change the water or dilute the water sufficiently to keep pace with the accumulation of the dirt or human wastes which result from a large number of bathers. This lake is provided with a submerged purification system which is submerged in the lake so that the water passing through the purification system is substantially at the same level as the water in the lake. The purification system includes a conduit 2 which in the illustrative embodiment of the invention is U-shaped defining an inner pool 3 which is the deep swimming pool, the same being partially surrounded by the shallow pool 4 in which the bottom slopes gradually up to the shore line.

It will be observed from Figure 1 that the conduit 2 has an open end 5 communicating with the deep pool 3. Chemical apparatus 6 is positioned adjacent the open end 5 of conduit 2 which is mechanically and continuously operated while the purification system is working to drop chemicals preferably in powdered or liquid form into the water entering the conduit 2. These chemicals preferably include one for liberating chlorine for bactericidal purpose while the other is preferably a flocculator for the suspended foreign matter, largely organic, which contaminates the water. Adjacent the end 5 of the conduit 2 is a pump 7 which is preferably in the form of a water wheel. It is positively driven so as to draw water in at the open end 5 and discharge it from the posterior end 8 of the conduit 2. A certain section of the conduit 2 designated by the reference character 9 in Figure 1 is a mixing chamber in which the chemicals fed to the water by the apparatus 6 are thoroughly mixed with the water. The mixing chamber is provided with a series of baffles 10 which are spaced from the bottom of the conduit 2 and extend to the top of the same and alternating baffles 11 which are against the bottom of the conduit, but terminate below the top of the conduit 2 so that the chemicalized water delivered by the pump 7 travels in a sinuous course below one baffle and above the next throughout the length of the mixing chamber. Beyond the mixing chamber the conduit 2 constitutes a reaction chamber 9' in which the chemicals which have been thoroughly mixed have time and opportunity to flocculate the suspended matter in the water. The pump is of such power and the conduit 2 of such cross sectional dimension that the water under treatment is kept flowing through said conduit at a velocity which prevents the deposit of the sludge resulting from the flocculation while the water is travelling through said conduit.

At its posterior end 8 the conduit 2 debouches into a settling basin 12. This is preferably provided with baffles 13 and 14 extending alternately from opposite sides and the top edges of which are at least as high as the level of water in the settling chamber so that the water will not flow over these baffles, but must drift around them. The velocity of flow is so checked in the settling basin that the flocculated matter goes to the bottom and lies there in the form of a sludge. It may be removed once or twice a year as circumstances may necessitate. At the end of the settling basin 12 is a dam 15, the upper edge 16 of which is at a slightly lower level to that of the water in the settling basin so that the water must flow over this dam. Beyond the dam 15 is a wall 17, the upper edge of which is at least as high as the level of water in the lake so that water cannot flow over it and at its bottom, it is provided with a plurality of openings or arches 18 readmitting the water to the shallow pool 4 of the swimming lake. The space between the dam 15 and the wall 17 is preferably filled with rocks and sand forming a filter through which all the water treated in the purifying system must percolate before it is returned to the swimming pool.

A submerged tunnel 19 places the shallow pool 4 into communication with the deep pool 3 at a point preferably diagonally opposite the inlet or open end 5 of the purification system. Other conduits or troughs 20 place the shallow and deep pools into communication at water level.

Inasmuch as the structure forming the purification system, with the exception of the water wheel and the chemical feeding apparatus 6, is submerged, it is possible to make the conduit 2, the baffles 10 and 11, as well as the baffles 13 and 14, the dam 15 and the wall 17 of light material, such, for example, as three-quarter inch lumber since no real attention need be paid to internal pressure, the pressure being equal on both sides of these structural elements. This makes it possible to build and to operate this water purification system at a minimum of expense which is a controlling factor in the practical operation of roadside or tourist camp swimming pools.

The system of the present invention may be operated either while bathing is in progress or after hours. After a day's use, it will be found that the feet of the bathers will have kicked up the natural silt and whatever other sedimentary matter may be at the bottom of the shallow pool so that the water may be extremely cloudy and full of suspended matter. This, of course, will be more noticeable in the shallow pool than in the deep pool where the feet of the bathers rarely touch the bottom.

To operate the purification system, the motors, not shown, which operate the chemical feeding apparatus 6 and the water wheel 7 are turned on. Water begins immediately to be withdrawn from the deep pool and to circulate through the conduit 2 receiving chemical dropped from the chemical feeding apparatus 6 and passing over and under the baffles 10 and 11 where the chemical is thoroughly mixed with the water. From thence the water passes through the remaining portion of the conduit 2, altogether segregated from the main body of water in the swimming lake and at a velocity sufficient to prevent the depositing of any of the flocculated foreign matter. The passage of the chemically treated water through the posterior portion of the conduit 2 gives the chemicals the time and opportunity to completely flocculate the suspended matter. When the water flows out into the settling basin 12, the velocity of flow becomes practically zero and the flocculated matters are precipitated. The water is then filtered in the mass of filtering material between the dam 15 and the wall 17, being re-admitted to the shallow pool through the arches 18. As the level in the deep pool diminishes due to depletion by the pump 7, water from the shallow pool comes in through the tunnel 19. Inasmuch as the conduit 2 and all other water-containing portions of the purification system are submerged to the level of the lake a very small power is required to move a relatively large amount of liquid and consequently the rate of purification can readily be made to exceed the rate of contamination. In the practical embodiment of the invention which Figure 1 illustrates, all the water in the lake can be reconditioned within 24 hours.

It is obvious that since the tunnel 19 is submerged below the water level, floating bodies such as matches, etc., will not be carried into the deep pool through said tunnel. This would cause an accumulation of surface trash in the shallow pool, to prevent which the troughs 20 are provided towards which floating matter will travel under the gentle drift produced by the pump and will cross over into the deep pool and will be finally carried into the settling basin.

It will be understood from the foregoing description of that form of the invention shown in Figures 1 to 4, inclusive, that the shallow and deep pools are purified serially. Very often it will be found that the deep pool remains clear while the shallow pool is turbid for reasons hereinbefore stated, that the bathers stand on the bottom of the shallow pool and stir up the silt while they swim in the deep pool and rarely touch the bottom. Under such circumstances, it is uneconomical to subject the entire body of water in both pools to the purification treatment where the purification of only the shallow pool would suffice.

The form of the invention shown in Figure 5 is designed to purify the deep and shallow pools alternatively. The only difference between the construction of that form of invention shown in Figure 5 and that illustrated in Fig. 1 is the provision of an additional conduit 21 communicating with the water in the shallow pool by means of a submerged tunnel 22 passing beneath the conduit 2, and a pair of gates 23 and 24 which may be alternatively opened. When the gate 23 is open the operation of the system is exactly as described in Figure 1. When the gate 24 is open and the gate 23 closed, the pump draws water direct from the shallow pool through the tunnel 22 and conduit 21 into the conduit 2 excluding the deep pool from the purification treatment.

It will be understood that while I have in Figures 1 and 6 applied my invention to a swimming lake which is divided into shallow and deep sections, the invention is equally well applicable to a single pool and the shape of the conduit 2 is a matter determined solely by the environment and not material to the scope of the invention.

Figure 6 shows an embodiment of my invention which is adapted for small pools either natural or artificial in which it may be practical to pump the water from the pool to an elevated purification system through the conduit 25 and to permit it to return by gravity through the conduit 26. The purification apparatus of the present invention consisting of the conduit 2, chemical feeding apparatus 6, pump 7, mixing chamber 9, and reaction chamber 9' are submerged in a small pool or lake 27. The advantage of this construction would be in the permissible frailness of the structure of the conduit 2 and its appurtenant parts reducing the cost of the purification system to a minimum.

While I have in the above description disclosed what I believe to be a preferred and practical embodiment of my invention, it will be understood to those skilled in the art that the arrangement of parts and details of construction may be varied to suit the exigencies of use from which it follows that the scope of the invention may be determined by a liberal construction of the appended claims.

What I claim is:

1. Method of reconditioning bodies of water comprising continuously segregating within the body of water to be treated a substantially horizontal column of water with a surface level substantially that of said body of water to be treated, introducing a purifying chemical into said water column at an anterior point in said water column, mixing the water and chemical in an anterior portion of said water column, permitting reaction of the chemical and water in a posterior portion of said water column under such velocity of flow as to substantially prevent sedimentation, discharging said water from said water column to a settling body of water with substantially no velocity where sedimentation takes place, and returning the thus purified water to the said first mentioned body of water.

2. Method of reconditioning bodies of water comprising segregating within the body of water to be treated a substantially horizontal water column with a surface level substantially that of the said body of water to be treated, introducing a flocculating chemical into said column of water at an anterior point in said water column, mixing the water and chemical in an anterior portion of said water column, permitting reaction of the flocculating chemical with the suspended matter in the water, in a posterior portion of said water column under such velocity of flow as to substantially prevent precipitation of the flocs, discharging said water from said water column into a settling body of water with substantially no velocity, the surface of which said settling body of water is substantially that of said water column, where precipitation takes place and returning the thus purified water from said settling body of water to the first mentioned body of water.

3. In a body of water to be reconditioned, a reconditioning system comprising a conduit immersed in said body of water and having an open end in communication with said body of water, the water level in said conduit being substantially the same as the water level of said body of water, means for drawing water from said body of water into the open end of said conduit and circulating the water through said conduit without producing a substantial head of water, means for adding a purifying chemical to the drawn water adjacent the open end of said conduit, means in the anterior portion of said conduit for mixing the chemical and water, the posterior portion of said conduit functioning as a reaction chamber and being of sufficient length to permit substantially complete reaction between the chemical and water impurities within said conduit, said circulating means moving the water through said conduit at a sufficient velocity to prevent sedimentation in said reaction chamber, means forming a settling basin containing water, the surface level of which is at the same level as that of said water body, said conduit arranged to discharge into said settling basin, and means permitting the return of water from said settling basin to said body of water.

4. In a body of water to be reconditioned, a reconditioning system comprising a conduit immersed in said water body of water and having an open end in communication with said body of water, the water level within said conduit being the same as that of said body of water, a pump for drawing water from said body of water into the open end of said conduit and circulating the water through said conduit without producing a substantial head of water, chemical feeding means at the open end of said conduit, baffles arranged transversely of the anterior portion of said conduit alternately spaced from the top and bottom of said conduit directing said water in a sinuous path and forming with the anterior portion of said conduit a mixing chamber, the posterior portion of said conduit functioning as a reaction chamber and being of sufficient length to permit substantially complete reaction between the chemical and the water impurities, within said conduit, said circulating means moving the water through said conduit at a velocity sufficiently high to prevent sedimentation in said reaction chamber, means forming a settling basin containing water having a surface level the same as that of the water in said conduit and body of water, baffles in said settling basin alternately spaced from the opposite sides of said basin, said conduit discharging into said settling basin at a point anterior to the first of said series of baffles, said settling basin being in communication with said body of water whereby the purified water is returned to said body of water.

5. Combination as claimed in claim 4, a filter intervening between and communicating with said settling basin and said body of water.

6. In a body of water to be reconditioned, a reconditioning system comprising a conduit immersed in said water body, said conduit being shaped to substantially divide said body of water into an inner pool and an outer pool, said conduit having an open end communicating with said inner pool, a water level in said conduit being the same as the water level of said body of water, means for pumping water from said inner pool into the open end of said conduit and circulating the water through said conduit without producing a substantial head of water in said conduit, means for adding a purifying chemical to the drawn water adjacent the open end of said conduit, means in the anterior portion of said conduit for mixing the chemical and water, the posterior portion of said conduit functioning as a reaction chamber and being of sufficient length to permit substantially complete reaction between the chemical and water impurities within said conduit, said circulating means moving the water through said conduit at a velocity sufficient to prevent sedimentation in said reaction chamber, means forming a settling basin containing water having the same surface level as that of said body of water, said conduit discharging the chemically treated water into said settling basin, a discharge from said settling basin into the outer pool of said body of water and a submerged tunnel between said outer and inner pools at a point remote from the open inlet end of said conduit.

7. In a body of water to be reconditioned, a reconditioning system comprising a conduit immersed in said water body and shaped so as to substantially divide said body of water into an inner and outer pool having an open end in communication with said inner pool, with the water level in said conduit the same as the water level of said body of water, means for drawing water from said inner pool into the open end of said conduit and circulating the water through said conduit without raising a substantial head of water, means for adding a purifying chemical to the drawn water adjacent the open end of said conduit, a series of baffles in the anterior portion of said conduit alternately spaced from the top and bottom of said conduit directing the flow of water through the anterior portion of said conduit through a sinuous path and making the anterior portion of said conduit a mixing chamber, the posterior portion of said conduit functioning as a reaction chamber and being of sufficient length to permit substantially complete reaction between the chemical and water impurities within said conduit, said circulating means moving the water through said conduit at a sufficient velocity to prevent sedimentation in said reaction chamber, means forming a settling basin containing water, the surface level of which is the same as that of said conduit, a series of baffles in said settling basin alternately spaced from the opposite sides of said basin, said conduit discharging into said basin at a point anterior to the first of said second series of baffles, a discharge for the water from said settling basin into said outer pool, and a submerged tunnel placing said inner and outer pools in communication at a point remote from the open inlet end of said conduit.

8. Combination as claimed in claim 7, including a filter between and communicating with said settling basin and said outer pool.

9. In a body of water to be reconditioned, a reconditioning system comprising a conduit immersed in said body of water and extended in such a direction as to divide said body of water into an inner and an outer pool, said conduit having an open end communicating with said inner pool, with the water level in said conduit the same as the water level of said body of water, means for drawing water from said body of water into the open end of said conduit and circulating the water through said conduit without reducing the substantial head of water, means for adding a purifying chemical to the drawn water adjacent the open end of said conduit, means in the anterior portion of said conduit for mixing the chemical with the water, the posterior portion of said conduit functioning as a reaction chamber and being of sufficient length to permit substantially complete reaction between the chemical and water impurities within said conduit, said circulating means moving said water through said conduit at a sufficient velocity to prevent sedimentation within said reaction chamber, means forming a settling basin containing water at the level of said body of water, into which settling basin said conduit discharges, a discharge for the purified water between said settling basin and said outer pool, a submerged tunnel through said conduit between said inner and outer pools at a point remote from the inlet end of said conduit, and means forming a channel bridging said conduit at a point adjacent the water level and remote from the inlet of said conduit placing the surface of said inner and outer pools into communication whereby floating matter may pass from outer to said inner pool.

10. In a body of water to be reconditioned, a reconditioning system comprising a conduit immersed in said water body and extended in such a direction as to substantially divide said body of water into inner and outer pools, said conduit having an open end, means for placing the open end of said conduit optionally into communication with said inner or said outer pool, the water level in said conduit being the same as the water level of said body of water, means for drawing water from said body of water into the open end of said conduit and circulating the water through said conduit without producing a substantial head of water, means for adding a purifying chemical to the drawn water adjacent the open end of said conduit, means in the anterior portion of said conduit for mixing the chemical with the water, the posterior portion of said conduit being of sufficient length to substantially complete the reaction between the chemical and water impurities within said conduit, said circulating means moving the water through said conduit at a velocity sufficiently high to prevent sedimentation in said reaction chamber, means forming a settling basin containing water at the same level as the water in said body of water, into which said settling basin said conduit discharges, and a discharge from said settling basin to said body of water.

11. In a body of water to be reconditioned, a reconditioning system comprising a conduit immersed in said water body and extended in such a direction as to substantially divide said body of water into inner and outer pools, said conduit having an open end, means for placing the open end of said conduit optionally into communication with said inner or said outer pool, the water level in said conduit being the same as the water level of said body of water, means for drawing water from said body into the open end of said conduit and circulating the water through said conduit without producing a substantial head of water, means for adding a purifying chemical to the drawn water adjacent the open end of said conduit, a series of baffles in the anterior portion of said conduit alternately spaced from the top and bottom of said conduit directing the water in a sinuous path for mixing the chemical with the water, the posterior portion of said conduit functioning as a reaction chamber and being of sufficient length to permit substantially complete reaction between the chemical and water impurities within said conduit, said circulating means moving the water through said conduit at a velocity high enough to prevent sedimentation in said reaction chamber, means for forming a settling basin containing a relatively large body of water with substantially no velocity and a series of baffles extending from the top to the bottom of the water within said settling basin and spaced alternately from the opposite sides of said basin, said conduit discharging into said settling basin anteriorly of the second of said series of baffles and said settling basin discharging into said outer pool.

12. Means for purifying water in lakes, ponds, and the like, comprising means in the body of water to be treated constituting a circuitous channel, said channel communicating with the body of water at each end only and varying in width and depth in predetermined sequence to control the rate of flow and depth of the water in the channel in different zones, means for treating the water in the channel and means for inducing a current of water through said channel, the water in the channel and the main body of water being at substantially the same level throughout.

RICHARD D. MOORE.